March 31, 1936.  J. W. RICHBOURG  2,036,100
REMOTE CONTROL BY FLUID TRANSMISSION
Filed May 11, 1934
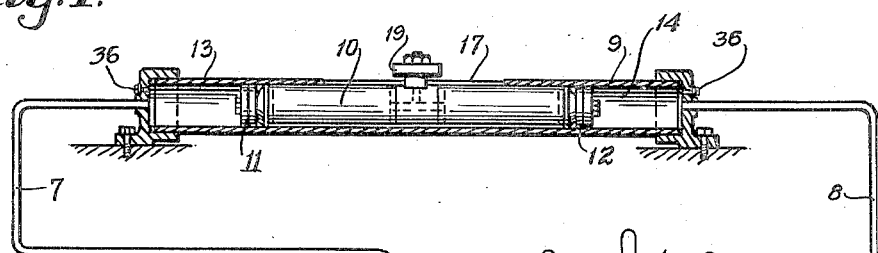
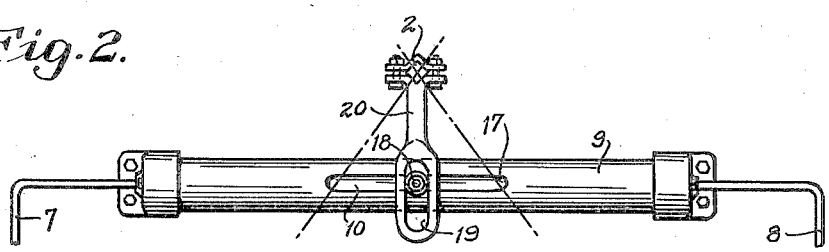
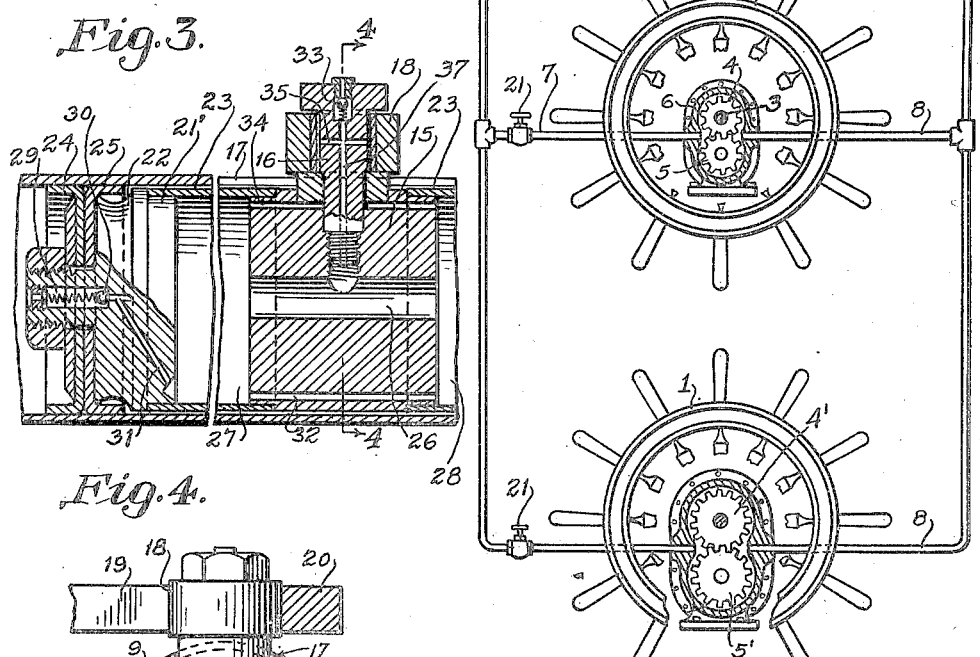
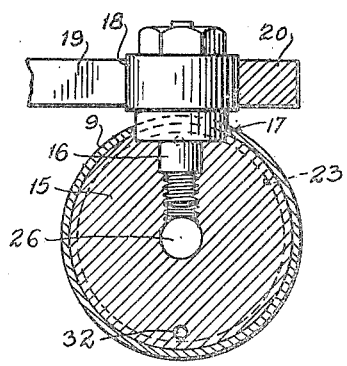
Inventor
JAMES W. RICHBOURG
By Mason Fenwick Lawrence
Attorney Patented Mar. 31, 1936

2,036,100

UNITED STATES PATENT OFFICE 2,036,100

REMOTE CONTROL BY FLUID TRANSMISSION

James W. Richbourg, St. Augustine, Fla., assignor of one-half to Acme Machine Works, St. Augustine, Fla., a partnership composed of Frank W. Cheatham and Lewis E. Cheatham Application May 11, 1934, Serial No. 725,217

4 Claims. (Cl. 60—52)

This invention relates to the control, either proximate or remote, of devices generally, by force transmitted selectively in opposite directions through columns of incompressible fluid to the controlled device.

One of the objects of the invention is to provide a system including a reversible pump, the differential pressure between the induction and eduction sides of which determines the direction of the dominant pressure applied to the motor element, said pump being preferably of simple construction and few parts and displaceably related with respect to the motor element so as to make it possible to locate the motor in any convenient location, irrespective of the position of the pump.

A further object of the invention is to provide a remote control system operating upon the principle of fluid transmission in which throughout inactive periods the fluid is under no greater pressure than that imposed by gravity.

Another object of the invention is the provision of a remote control system which may include a plurality of control stations from any of which the motor element which effects the control may be operated independently of the other.

Other objects of the invention will appear as the following description of a preferred and practical embodiment thereof proceeds.

In the drawing which accompanies and forms a part of the following specification and throughout the several figures of which the same characters of reference have been employed to designate identical parts:

Figure 1 is a view partly in section and largely diagrammatic of a system embodying my invention;

Figure 2 is a plan view of the motor element;

Figure 3 is a sectional view on a large scale of parts of the motor element, intermediate and end portions being broken away; and Figure 4 is a cross section taken on the line 4—4 of Figure 3.

Referring now in detail to the several figures, the numeral 1 represents the control lever which in the present exemplary embodiment of the invention is the steering wheel of a boat, 2 being the rudder post, remotely controlled. The shaft of the wheel 1 is in common with the shaft 3 of one of the pair of gears 4 and 5 constituting the cooperating impelling elements of the gear pump 6. Since the steering wheel 1 is actuable in opposite directions, the gear pump is reversible. The chambers of the gear pump 6 are connected by conduits 7 and 8 with the opposite ends of a motor cylinder 9. Within the motor cylinder slides a unitary double piston 10 having heads 11 and 12 at its opposite ends. Said heads form the movable walls of pressure chambers 13 and 14 formed in opposite ends of the cylinder 9. The conduits 7 and 8 communicate with the chambers 13 and 14. The conduits and the chambers 13 and 14 as well as the chambers of the pump are filled with an incompressible fluid such as oil. When pressure is transmitted by the pump through the fluid in the conduit 7 to the head 11 of the piston, the entire piston moves over toward the right. When, on the other hand, pressure is applied through the conduit 8, to the piston head 12, the piston moves over to the left. The movement of the piston to either side of the cylinder 9 is assisted by decrease in pressure on that side of the pump which is at the moment the induction side. Since it is essential that there be no air in the system at any time, the cylinder heads are provided with vents closed by plugs 36 which may be taken out when need requires for withdrawing any air which may have collected in the chambers 13 and 14.

The piston 10 is provided in its mid-section with a block 15 having a bore in the top in which a pin 16 is screwed. As the piston 10 travels back and forth in the cylinder 9 the pin 16 traverses a slot 17 formed in the top of the cylinder. A bushed roller 18 surrounds the projecting portion of the pin, which roller traverses an eye 19 in the tiller lever 20. Thus, by the selective reciprocation of the piston produced by rotation of the steering wheel in one or other direction, the oscillation of the rudder post is effected.

It will be observed that the pump 6 requires no packing or other sealing device between the induction and eduction sides, that it is of simple construction and can be readily installed in the minimum space wherever it may be convenient to install the steering wheel. Since the pump is connected to the motor element or cylinder 9 by mere pipe connections it is obvious that the cylinder 9 and the structure appurtenant thereto can be located remote from the steering wheel and in any convenient position thus adapting the system to all types of boats or vehicles without reference to the location or the amount of space available for the installation of the device.

It will be understood from Figure 1 that there may be more than one steering station in the control system it being merely necessary to provide a pump for each station and to connect the pumps in parallel relation with respect to the fluid columns. A valve 21 may be placed in the branch to each pump on one side of the pump. When the helmsman upon leaving one station closes the valve 21 associated with said station, the rudder remains locked until he reaches the other station, opens the valve 21 related to said second station and takes active command of the steering operation. While either of the valves 21 remains closed the steering wheel associated therewith will remain inert during the operation of the other wheel.

By providing gear pumps having gears of different diameter at the several stations, it is possible to obtain, if desired, different power ratios in the operation of the several wheels. In Figure 1, the lower gear pump has impeller gears 4' and 5' of greater diameter than the gears 4 and 5 in the upper gear pump, thus requiring more power to operate the rudder from the lower station than from the upper station.

In order to assure that the fluid system will always be full of fluid and air voids thus prevented which would give rise to lost motion between the steering wheel and motor element, means for automatically adding make-up fluid to the system is provided in connection with the motor element rather than with the pump in view of the intent of the invention to make the pump unit as simple as possible adapting its installation to small cramped locations which usually exist in the pilot house.

It will be observed from Figures 1 and 3 that the piston 10 is made up of a head portion 22 at each end and the block 15 in the middle, said head portion and block being rabbeted at 21' to receive the cylindrical shell 23 which is brazed or welded to the head portion and block respectively, making a unitary structure. The head portion is provided with two cup leathers 24 and 25 having their flanges oppositely directed, the former sealing against leakage of oil under pressure from the chambers 13 or 14 respectively, and the latter sealing the chambers 13 and 14 against atmospheric leakage through the slot 17 in the cylinder 9.

The block 15 is preferably provided with a transverse bore 26 opening on opposite sides of said block in the chambers 27 and 28 on the inside of the piston. The bore 26 communicates with the bore in which the pin 16 is normally screwed. When the pin 16 is taken out, oil can be poured into the bore thus vacated and flow through the bore 26 in both directions into the chambers 27 and 28 on the interior of the piston. The head portion 22 of the piston is provided with a passage 29 controlled by an outwardly opening check valve 30. An inclined bore 31 opens into the chamber 27 near the bottom thereof and communicates with the valve controlled passage 29. The same construction is provided at both ends of the piston. It is obvious that the make-up oil should be supplied to the chambers 27 and 28 in sufficient quantity to stand above the lower end of the bore 31. Preferably, said chambers are filled with oil to more than half their height. The oil is under no pressure superior to that of gravity. When the piston moves to the left the decrease in pressure in the chamber 13 will, if there is any air in that side of the system, raise the check valve 30 and draw oil from the reservoir within the chamber 27. In this respect both sides of the piston function alike.

In order that the oil shall be at the same level in both the chambers 27 and 28, the block 15 is preferably provided with a channel 32 in its lower portion. For it to be possible to draw oil from the chambers 27 or 28, provision must be made for the admission of atmospheric air to said chambers, otherwise they will become air bound. Air is admitted through a downwardly opening check valve 33 which normally closes a passage 37 extending longitudinally through the pin 16 and communicating with the bore 26. The pin 16 is provided with a transverse passage 35 opening in the joint between the pin and roller 18 and communicating with the longitudinal passage 37 through said pin for lubricating the bearing of said roller.

In filling the chambers 27 and 28 when the pin 16 has been removed, it is obvious that just as soon as the level of the oil rises above the bore 26, air will be trapped in the upper part of the chambers 27 and 28 preventing further filling, unless provisions are made for the contrary. The block 15 is therefore provided with a channel 34 near its upper end communicating with the bore which is left open by the removal of the pin 16 when filling the reservoir.

On account of the fact that the make-up fluid is supplied by gravity and that no pressure exists in the system except during the periods when one or other of the steering wheels is being positively actuated, there will be no tendency for the fluid to leak past the heads of the piston or at any other sealed point.

Although I have in the above description described what I believe to be a preferred and practical embodiment of the invention, it will be understood by those skilled in the art that the invention may be applied not only to the steering of vessels, but to the control of land vehicles, aeroplanes or machines in general, and that the details of construction as shown and described are merely by way of example and not to be construed as limiting the scope of the invention as claimed.

What I claim is:

1. In a hydraulic remote control system, a motor element comprising a cylinder having a fluid chamber at each end and a double acting hollow piston in said cylinder, a reversible pump having its chambers connected to the fluid chambers of the cylinder by hydraulic columns for creating dominant pressure alternatively in said chambers for actuating said piston, the piston having an internal partition intermediate its ends defining fluid make-up reservoirs on opposite sides of said partition, a pin removably secured in a bore in said partition and extending through a longitudinal slot in said cylinder, said pin being the connection to a controlled device, said partition having a transverse bore communicating with both of said reservoirs and with the bore occupied by said pin the latter bore acting as a filling passage when vacated by said pin and the transverse bore serving to supply both reservoirs, the heads of said piston having passages communicating with the fluid chambers of said cylinder on the one hand and with said reservoirs near the bottom thereof on the other, and outwardly opening check valves in said last named passages.

2. In a hydraulic remote control system as claimed in claim 1, the partition having a transverse passage near the bottom communicating with both reservoirs for equalizing the level therein, and a passage near its top communicating with the bore in which said pin is seated, acting as an air vent when said pin is removed permitting the filling of said reservoirs substantially to the top thereof.

3. In a hydraulic remote control system as claimed in claim 1, said pin having a passage communicating with said reservoirs and with atmosphere, and an inwardly opening check valve in said passage.

4. In a hydraulic remote control system, a motor element comprising a cylinder having a fluid chamber at each end and a double acting hollow piston in said cylinder, a reversible pump having its chambers connected to the fluid chambers of the cylinder by hydraulic columns for creating dominant pressure alternatively in said chambers for actuating said piston, the piston having an internal partition intermediate its ends defining fluid make-up reservoirs on opposite sides of said partition, and means carried by said partition for introducing make-up fluid into said reservoirs, the heads of said piston having passages provided with outwardly opening check valves to control the flow of make-up fluid from said reservoirs to said columns.

JAMES W. RICHBOURG.